United States Patent
Rim

[11] Patent Number: 5,907,498
[45] Date of Patent: May 25, 1999

[54] CIRCUIT AND METHOD FOR OVERFLOW DETECTION IN A DIGITAL SIGNAL PROCESSOR HAVING A BARREL SHIFTER AND ARITHMETIC LOGIC UNIT CONNECTED IN SERIES

[75] Inventor: Min-Joong Rim, Kyungki-do, Rep. of Korea

[73] Assignee: Samsung Electronics, Co., Ltd., Suwon, Rep. of Korea

[21] Appl. No.: 08/904,654

[22] Filed: Aug. 1, 1997

[30] Foreign Application Priority Data

Jan. 16, 1997 [KR] Rep. of Korea ............... 97-1122

[51] Int. Cl.[6] ............................................. G06F 7/38
[52] U.S. Cl. ............................................. 364/745.04
[58] Field of Search .................. 364/745.04, 745.03, 364/748.04

[56] References Cited

U.S. PATENT DOCUMENTS

| | | | |
|---|---|---|---|
| 4,811,268 | 3/1989 | Nishitani et al. | 364/745.03 |
| 5,231,600 | 7/1993 | Robidoux et al. | 364/745.04 |
| 5,260,890 | 11/1993 | Suzuki | 364/745.04 |
| 5,508,951 | 4/1996 | Ishikawa | 364/745.03 |
| 5,745,397 | 4/1998 | Nadehara | 364/745.04 |

*Primary Examiner*—David H. Malzahn
*Attorney, Agent, or Firm*—Marger Johnson & McCollom P.C.

[57] ABSTRACT

A digital signal processor (DSP) having a serially connected barrel shifter and arithmetic logic unit and overflow detecting method thereof is disclosed. The barrel shifter of the digital signal processor generates a first operand defined as $a2^N+A$, where $-2^M \leq a < 2^M$, $0 \leq A < 2^N$, and M and N are integers, by barrel-shifting an input data operand A. A code extender of the DSP generates a second operand defined as $b2^N+B$, where $b=0$ or $-1$ and $0 \leq B < 2^N$, by code-extending an input data operand B. An arithmetic logic unit in the DSP adds the first and second operands and generates a result. An overflow detector monitors a parameter a of the first operand, a parameter b of the second operand and an $(N-1)$-th carry $C_{N-1}$ from the arithmetic logic unit in order to detect an overflow condition. An output selector, responsive to an output of the overflow detector, selects either a maximum value of an effective range of the DSP when a positive overflow event occurs, a minimum value of the effective range when a negative overflow event occurs, or the result from the arithmetic logic unit when no overflow event occurs.

8 Claims, 3 Drawing Sheets

CIRCUIT AND METHOD FOR OVERFLOW DETECTION IN A DIGITAL SIGNAL PROCESSOR HAVING A BARREL SHIFTER AND ARITHMETIC LOGIC UNIT CONNECTED IN SERIES

BACKGROUND OF THE INVENTION

1. Field of the Invention

The present invention relates to a circuit and method for overflow detection in a digital signal processor (DSP) having a serially connected barrel shifter and arithmetic logic unit (ALU). More particularly, the present invention relates to a DSP and overflow detection method which considers an operand output from the barrel shifter, an operand output by a code extender and a carry signal from the ALU to detect a positive or negative overflow condition without degrading the performance of the DSP.

2. Description of the Prior Art

FIG. 1 shows an example of a conventional DSP in which a barrel shifter is serially connected to an adder. Inside a typical high-speed DSP, a barrel shifter 11 is generally connected in series with an ALU having a modified form of the adder as indicated in FIG. 1. If the serially connected barrel shifter 11 and ALU are used during a single operational clock cycle, an overflow condition may be generated. Usually, an overflow detector 15 is used to provide for the case where the sign of the overflow result is changed during the occurrence of an overflow event.

Generally, the overflow detector 15 generates a maximum value within an effective number range of the DSP of FIG. 1 when a positive overflow is generated and generates a minimum value when a negative overflow is generated. Therefore, it is desireable that the overflow detector 15 detect the overflow condition and output the appropriate value within a short time period so as not to lower the performance of the DSP.

In the circuit of FIG. 1, if barrel shifter 11 is not present, then the overflow detector 15 can sense the positive and negative overflow states by using carry signals of two highest-order bits of the ALU 14. However, when the barrel shifter 11 is connected between the input and the ALU 14, as shown in FIG. 1, then the method described above is not adequate to detect the overflow condition.

During operation of the DSP of FIG. 1, a first 32 bit operand input to a left input LEFT is converted to 40 bits by barrel shifter 11 and a second 32 bit operand input to a right input RIGHT is converted to 40 bits through code extender 13. The resulting 40 bit operands are input to the 40-bit ALU 14. When ALU 14 operates in saturation mode, then a 40 bit result is generated from the ALU 14 and is output to multiplexer 32 where the 40 bit result from ALU 14 is converted into 32 bits under the control of overflow detector 15. A 32-bit saturated result appears at the output of multiplexer 17. It is typical in DSPs that the number of bits of the ALU 14 is larger than the effective number of bits of the DSP.

A special barrel shifter is needed to sense the overflow for a portion of the result which is completely lost, but in most applications it is sufficient to sense the overflow of only the 40 bits of the result from the ALU 14. Therefore, overflow detector 15 senses overflow using the nine high-order bits (39:31) of the result from the ALU 14 and, responsive thereto, controls the multiplexer 17.

However, since the barrel shifter 11 and the ALU 14 form a critical path in the DSP, additional processing of the result from the ALU 14 degrades the performance of the DSP.

FIG. 2 illustrates another conventional overflow detection system used in the D950 core from SGS-Thomson. The overflow condition is detected in the DSP of FIG. 2 by using carry signals C30 and C31 from the ALU 14. However, since the overflow is sensed only by examining two high-order bits of the ALU without detecting an actual overflow, the actual result from the barrel shifter 11 is disregarded in determining whether an overflow has occurred.

SUMMARY OF THE INVENTION

It is therefore an object of the present invention to provide a circuit and method for overflow detection in a DSP which does not degrade the performance of the DSP by detecting the overflow condition based upon the output of a barrel shifter, the output of a code extender and a carry signal produced by an ALU.

An embodiment of a DSP according to the present invention includes a barrel shifter configured to receive a data input A and generate a first operand defined as $a2^N+A$ by barrel-shifting data input A, where $-2^M \leq a < 2^M$, $0 \leq A < 2^N$, and M and N are integers and a code extender configured to receive a data input B and generate a second operand defined as $b2^N+B$ by code-extending data B, where $b=0$ or $-1$ and $0 \leq B < 2^N$. The DSP also includes an arithmetic logic unit which receives the first and second operands and generates a result by adding the first operand to the second operand. An overflow detector of the DSP is configured to receive the a component of the first operand, the b component of the second operand and an (N–1)-th carry $C_{N-1}$ signal from the arithmetic logic unit and, responsive thereto, generate an output signal indicating whether an overflow condition is generated by the adding operation of the first operand to the second operand of the arithmetic logic unit. An output selector of the DSP receives the output signal from the overflow detector and, responsive thereto, selects a maximum value among effective values of the digital signal processor when the output signal indicates a positive overflow condition, selects a minimum value among the effective values of the digital signal processor when the output signal indicates a negative overflow condition, and selects an effective portion of the result from the arithmetic logic unit when the output signal indicates no overflow condition.

An embodiment of an overflow detection method for a digital signal processor having a barrel shifter and an arithmetic logic unit connected in series, according to the present invention, includes barrel-shifting a first data input operand A through the barrel shifter to generate a first operand defined as $a2^N+A$, where $-2^M \leq a < 2^M$, $0 \leq A < 2^N$, M and N are integers, code-extending a second data input operand B to generate a second operand defined as $b2^N+B$, where $b=0$ or $-1$, $0 \leq B < 2^N$, and generating an (N–1)th carry $C_{N-1}$ by adding the first operand to the second operand in the arithmetic logic unit. The method also includes detecting a positive overflow event when one of the following conditions is true: (b=0 and a>0),(b=–1 and a>1), {(b=0 and a=0) and $(C_{N-1}=1)$}, and {(b=–1 and a=1) and $(C_{N-1}=1)$} and detecting a negative overflow event when one of the following conditions is true: (b=0 and a<–2), (b=–1 and a<–1), {(b=0 and a=–2) and $(C_{N-1}=0)$}, and {(b=–1 and a=–1) and $(C_{N-1}=0)$}.

DETAILED DESCRIPTION OF PREFERRED EMBODIMENT

Figure 1:
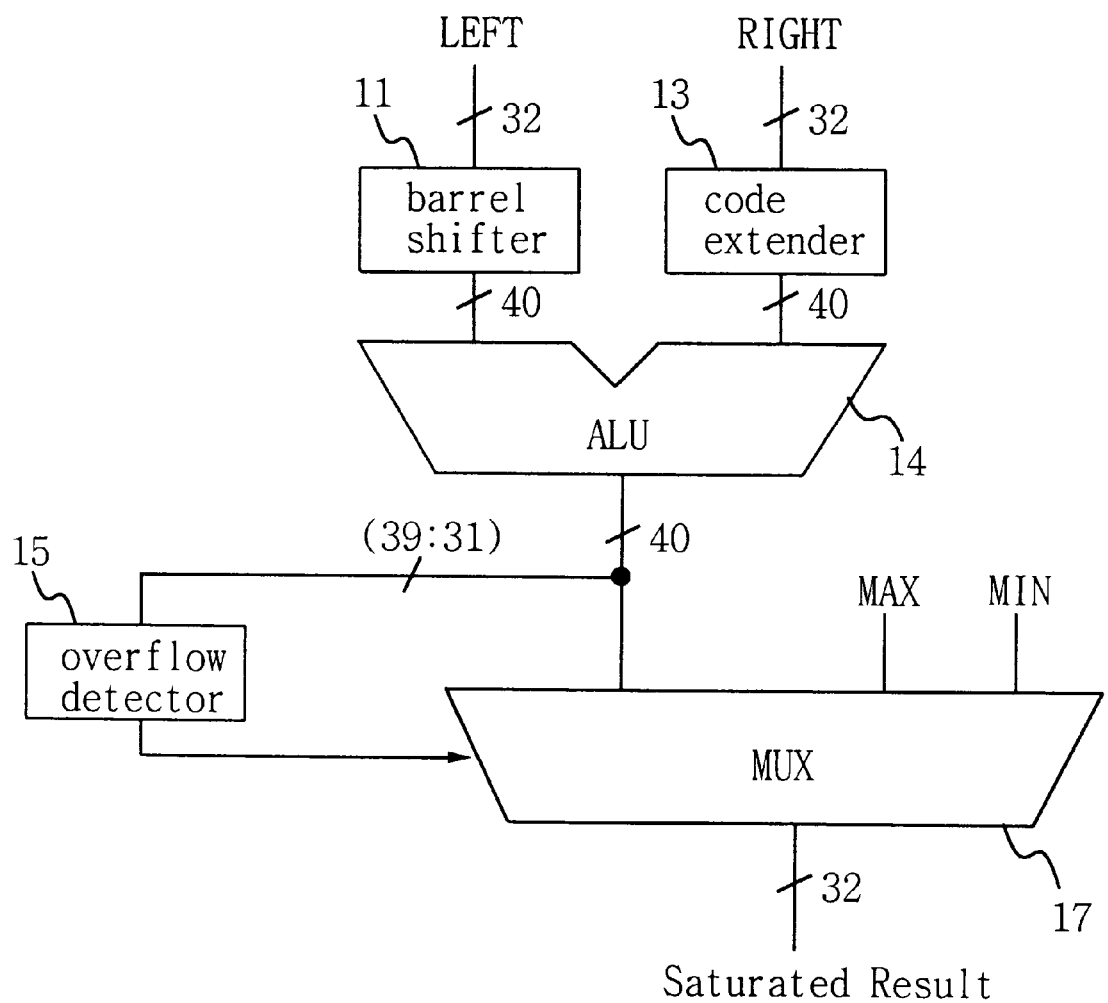
FIG. 1. is a block diagram of a conventional DSP in which a barrel shifter is serially connected with an ALU.
Figure 2:
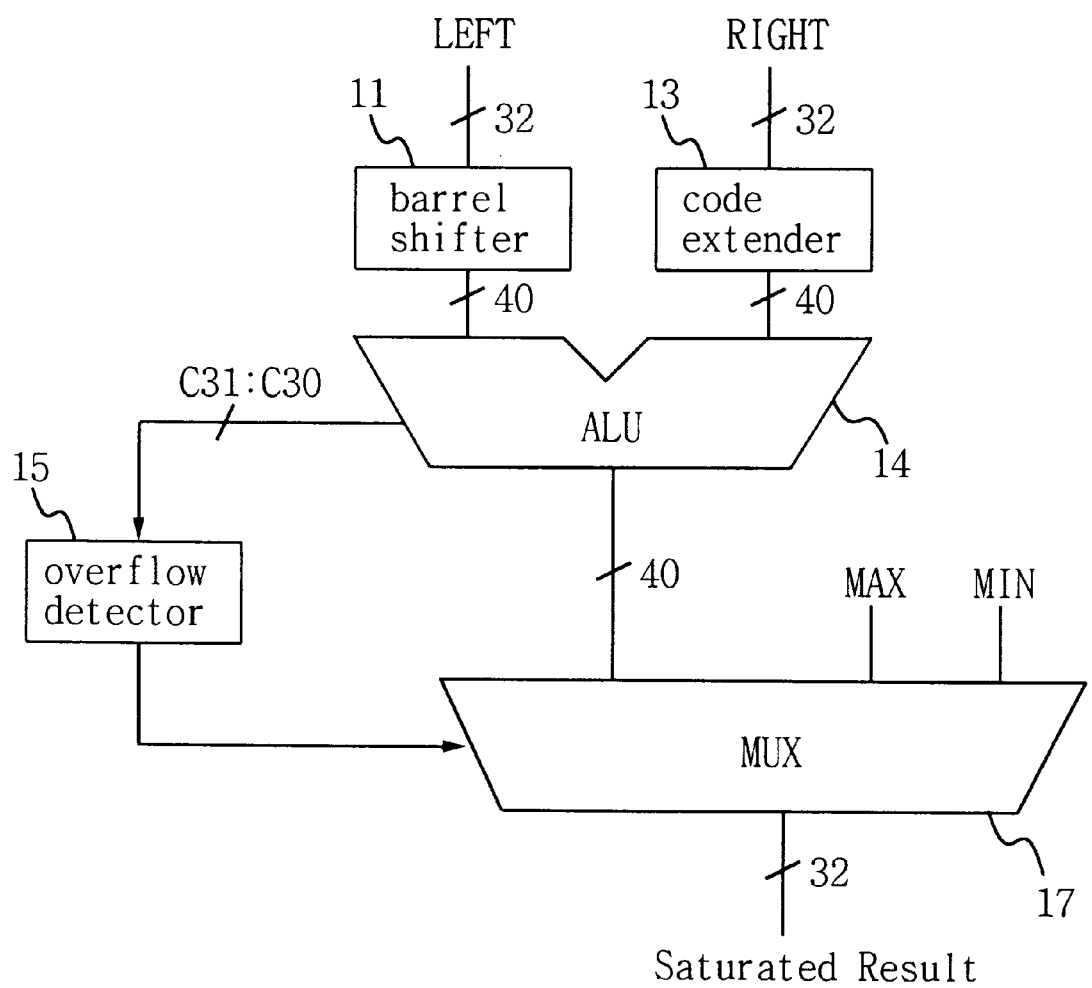
FIG. 2 is a block diagram of another conventional DSP in which the barrel shifter is serially connected to the ALU.
Figure 3:
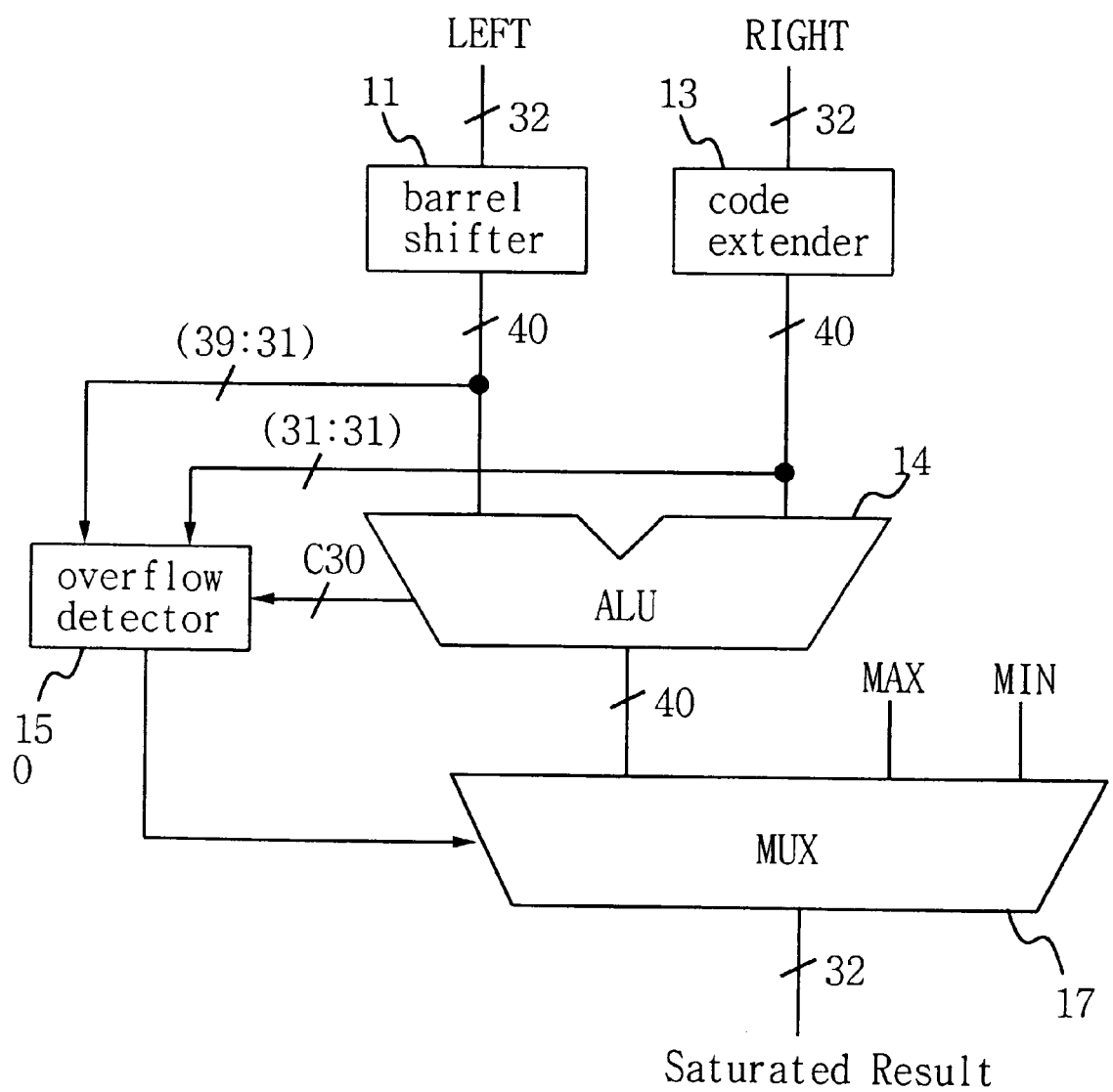
FIG. 3 is a block diagram of an embodiment of a DSP according to the present invention in which the barrel shifter is serially connected to the ALU.

Referring to FIG. 3, an embodiment of a DSP according to the present invention includes a barrel shifter 11 for receiving a left input of 32 bits and generating an output of 40 bits, a code extender 13 for receiving a right input of 32 bits and generating a code-extended output of 40 bits, an ALU 14 connected in series to the barrel shifter 11, and an overflow detector 150 for controlling a multiplexer 17 by detecting an overflow state from the output of the barrel shifter 11 and the output of the code extender 13 and a carry signal C30 of a specific bit produced from the ALU 14.

The overflow detector 150 checks an input condition of nine high-order bits (31:39) of the output of barrel shifter 11 applied to the ALU 14, one high-order bit (31:31) of the output of code extender 13 applied to the ALU 14 and the carry signal C30 from the 30th bit position of ALU 14. The overflow detector 150 detects the positive overflow and the negative overflow using the input conditions of these signals.

In operation, when the left input operand to the ALU 14 from barrel shifter 11 and the right input operand to the ALU 14 from code extender 13 are 40 bits each, then the inputs and the output of the ALU 14 can be represented by:

first operand $= a2^N + A$;

second operand $= b2^N + B$;

output of ALU $= a2^N + A + b2^N + B + \text{carry} = (a+b)2^N + A + B + \text{carry}$;

where $-2^M \leq a < 2^M$, $b = 0$ or $-1$, $0 \leq A < 2^N$, $0 \leq B < 2^N$, and carry $= 0$ or $1$. If operands of 32 bits and a 40-bit ALU 14 are used, then M is 8 and N is 31.

If a positive overflow state is produced in the ALU 14, then the output of the ALU 14 satisfies the following expression:

$$(a+b)2^N + A + B + \text{carry} \geq 2^N;$$

which can be rewritten as:

$a+b > 0$;

or $a+b = 0$ and $A+B+\text{carry} \geq 2^N$.

Since b is 0 or −1, then to satisfy the above equations:

(b=0 and a>0) or (b=−1 and a>1);

or

{(b=0 and a=0) or (b=−1 and a=1)} and $(A+B+\text{carry} \geq 2^N)$.

Since the expression $(A+B+\text{carry} \geq 2^N)$ is the case where the carry signal C30 (30th carry out) from the ALU 14 is 1, a positive overflow event satisfies the following conditions:

(b=0 and a>0) or (b=−1 and a>1);

or

{(b=0 and a=0) or (b=−1 and a=1)} and (C30=1)    (1)

From expression (1) above, since a and b are inputs to the ALU 14, the parts of the equation other than the carry signal C30 can be calculated during the execution period of ALU 14. Therefore, once the carry signal C30 is generated by ALU 14, then the determination can be made of whether the positive overflow has been generated.

For a negative overflow condition, the overflow determination calculations can also be made during the execution time of ALU 14. When a negative overflow is generated by ALU 14, then the output of the ALU 14 satisfies the following expression given by:

$$(a+b)2^N + A + B + \text{carry} < 2^N.$$

This can be rewritten as:

$a+b < -2$;

or $a+b = -2$ and $A+B+\text{carry} < 2^N$.

Since b is 0 or −1, then to satisfy the above conditions:

(b=0 and a<−2) or (b=−1 and a<−1);

or

{(b=0 and a=−2) or (b=−1 and a=−1)} and $(A+B+\text{carry} < 2^N)$.

Since the expression $(A+B+\text{carry} < 2^N)$ is the case where the carry signal C30 from the ALU 14 is 0, the negative overflow event satisfies the conditions given by:

(b=0 and a<−2) or (b=−1 and a<−1);

or

{(b=0 and a=−2) or (b=−1 and a=−1)} and (C30=0)    (2)

From equation (2), it can be seen that since a and b are inputs to the ALU 14, the parts of the equation other than the carry signal C30 can be calculated during the execution period of ALU 14. Therefore, once the carry signal C30 is generated by ALU 14, then the determination can be made of whether the negative overflow has been generated.

As noted above, the overflow detector functions by detecting the positive and negative overflow conditions using the inputs to the ALU 14 and the carry output C30 from ALU 14. Thus, the overflow detector takes into consideration the output of the barrel shifter without degrading the performance of the DSP.

In the drawings and specification, a specific embodiment of the present invention has been discussed which is used in a generic and descriptive sense only and not for purposes of limitation, the scope of the present invention being set forth in the following claims.

What is claimed is:

1. A digital signal processor comprising:

a barrel shifter configured to receive a data input A and generate a first operand defined as $a2^N+A$ by barrel-shifting data input A, where $-2^M \leq a < 2^M$, $0 \leq A < 2^N$, and M and N are integers;

a code extender configured to receive a data input B and generate a second operand defined as $b2^N+B$ by code-extending data B, where b=0 or −1 and $0 \leq B < 2^N$;

an arithmetic logic unit configured to receive the first and second operands and generate a result by adding the first operand to the second operand;

an overflow detector configured to receive the a component of the first operand, the b component of the second operand and an (N−1)-th carry $C_{N-1}$ signal from the arithmetic logic unit and, responsive thereto, generate an output signal indicating whether an overflow condition is generated by the adding operation of the first operand to the second operand of the arithmetic logic unit; and an output selector configured to receive the output signal from the overflow detector and, responsive thereto, select a maximum value among effective values of the digital signal processor when the output signal indicates a positive overflow condition, select a minimum value among the effective values of the digital signal processor when the output signal indicates a negative overflow condition, and select an effective portion of the result from the arithmetic logic unit when the output signal indicates no overflow condition.

2. The digital signal processor as set forth in claim 1, wherein the overflow detector is further configured to output the positive overflow condition indication when one of the following conditions is true: (b=0 and a>0), (b=−1 and a>1), {(b=0 and a=0) and ($C_{N-1}$=1)}, and {(b=−1 and a=1) and ($C_{N-1}$=1)}.

3. The digital signal processor as set forth in claim 1, wherein the overflow detector is further configured to output the negative overflow condition indication when one of the following conditions is true: (b=0 and a<−2), (b=−1 and a<−1), {(b=0 and a=−2) and ($C_{N-1}$=0)}, and {(b=−1 and a=−1) and ($C_{N-1}$=0)}.

4. An overflow detection method for a digital signal processor having a barrel shifter and an arithmetic logic unit connected in series, the method comprising the steps of:

barrel-shifting a first data input operand A through the barrel shifter to generate a first operand defined as $a2^N+A$, where $-2^M \leq a < 2^M$, $0 \leq A < 2^N$, M and N are integers;

code-extending a second data input operand B to generate a second operand defined as $b2^N+B$, where b=0 or −1, $0 \leq B < 2^N$;

generating an (N−1)th carry $C_{N-1}$ by adding the first operand to the second operand in the arithmetic logic unit;

detecting a positive overflow event when one of the following conditions is true: (b=0 and a>0), (b=−1 and a>1), {(b=0 and a=0) and ($C_{N-1}$=1)}, and {(b=−1 and a=1) and ($C_{N-1}$=1)}; and detecting a negative overflow event when one of the following conditions is true: (b=0 and a<−2), (b=−1 and a<−1), {(b=0 and a=−2) and ($C_{N-1}$=0)}, and {(b=−1 and a=−1) and ($C_{N-1}$=0)}.

5. The method of claim 4, including the steps:

selecting a maximum value in an effective range of the digital signal processor responsive to detecting the positive overflow event;

selecting a minimum value in the effective range of the digital signal processor responsive to detecting the negative overflow event; and selecting a result of adding the first operand to the second operand in the arithmetic logic unit in the arithmetic logic unit in the absence of the positive overflow event and the negative overflow event.

6. A digital signal processor comprising:

a barrel shifter configured to receive a data input A having N bits and generate a first operand having M+N bits, where M and N are integers and a represents a value of the most significant M bits of the first operand such that $-2^M \leq a < 2^M$;

a code extender configured to receive a data input B having N bits and generate a second operand having an N-th order bit b, where b=0 or −1;

an arithmetic logic unit configured to receive the first and second operands and generate a result by adding the first operand to the second operand;

an overflow detector configured to receive the a component of the first operand, the b component of the second operand and an (N−1)-th order carry signal from the arithmetic logic unit and, responsive thereto, generate an output signal indicating whether an overflow condition is generated by the adding operation of the first operand to the second operand of the arithmetic logic unit; and an output selector configured to receive the output signal from the overflow detector and, responsive thereto, select a maximum value among effective values of the digital signal processor when the output signal indicates a positive overflow condition, select a minimum value among the effective values of the digital signal processor when the output signal indicates a negative overflow condition, and select an effective portion of the result from the arithmetic logic unit when the output signal indicates no overflow condition.

7. The digital signal processor as set forth in claim 6, wherein the overflow detector is further configured to output the positive overflow condition indication when one of the following conditions is true: (b=0 and a>0), (b=−1 and a>1), {(b=0 and a=0) and (carry=1)}, and {(b=−1 and a=1) and (carry=1)}.

8. The digital signal processor as set forth in claim 6, wherein the overflow detector is further configured to output the negative overflow condition indication when one of the following conditions is true: (b=0 and a<−2), (b=−1 and a<−1), {(b=0 and a=−2) and (carry=0)}, and {(b=−1 and a=−1) and (carry=0)}

* * * * *

UNITED STATES PATENT AND TRADEMARK OFFICE
CERTIFICATE OF CORRECTION

PATENT NO.    : 5,907,498
DATED         : May 25, 1999
INVENTOR(S)   : Rim

It is certified that error appears in the above-identified patent and that said Letters Patent is hereby corrected as shown below:

Column 5,
Line 9, "$0 \leq B < 2^{N-}$" should read -- $0 \leq B < 2^N$ --;
Line 49, "$-2^M \leq a < 2^M$" should read -- $2^M \leq a < 2^M$ --.

Signed and Sealed this

Thirty-first Day of December, 2002

JAMES E. ROGAN
*Director of the United States Patent and Trademark Office*